(12) United States Patent
Dhoble et al.

(10) Patent No.: US 10,944,794 B2
(45) Date of Patent: Mar. 9, 2021

(54) REAL-TIME POLICY SELECTION AND DEPLOYMENT BASED ON CHANGES IN CONTEXT

(71) Applicant: DELL PRODUCTS L.P., Round Rock, TX (US)

(72) Inventors: Girish S. Dhoble, Austin, TX (US); Joseph Kozlowski, Hutto, TX (US); Ryan Comer, Austin, TX (US); Carlton A. Andrews, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 232 days.

(21) Appl. No.: 15/962,547

(22) Filed: Apr. 25, 2018

(65) Prior Publication Data

US 2019/0334952 A1    Oct. 31, 2019

(51) Int. Cl.
| | |
|---|---|
| *H04L 29/06* | (2006.01) |
| *H04L 12/26* | (2006.01) |
| *H04L 12/24* | (2006.01) |
| *H04W 12/00* | (2021.01) |

(52) U.S. Cl.
CPC .......... *H04L 63/20* (2013.01); *H04L 41/0893* (2013.01); *H04L 43/08* (2013.01); *H04L 63/10* (2013.01); *H04W 12/0027* (2019.01)

(58) Field of Classification Search
CPC ..... H04L 63/20; H04L 63/10; H04L 41/0893; H04L 43/08; H04W 12/0027
See application file for complete search history.

(56) References Cited

U.S. PATENT DOCUMENTS

| 7,260,830 B2* | 8/2007 | Sugimoto | ........... G06F 21/6218 726/1 |
| 7,363,650 B2* | 4/2008 | Moriconi | ............... G02B 6/132 726/1 |
| 7,757,268 B2* | 7/2010 | Gupta | ................... H04L 63/102 709/223 |

(Continued)

OTHER PUBLICATIONS

A. Arfaoui, S. Cherkaoui, A. Kribeche and S. M. Senouci, "Context-Aware Adaptive Remote Access for IoT Applications," in IEEE Internet of Things Journal, vol. 7, No. 1, pp. 786-799, Jan. 2020. (Year: 2020).*

(Continued)

*Primary Examiner* — Kari L Schmidt
(74) *Attorney, Agent, or Firm* — Egan, Enders & Huston LLP.

(57) ABSTRACT

A system is disclosed herein including a plurality of information handling systems (IHSs) coupled to and managed by a remote management system (RMS). According to one embodiment, each IHS may be configured to monitor data pertaining to the IHS, determine if the data triggers one or more events, and transmit a notification to the RMS if one or more events are triggered. The RMS may be configured to receive a notification transmitted from at least one IHS, select a policy to be applied to one or more of the IHSs based on the received notification, and transmit the selected policy to the one or more IHS s. The one or more IHSs may be further configured to receive the selected policy from the RMS, store the selected policy, and perform actions specified by the selected policy when policy rules specified by the selected policy are violated.

17 Claims, 7 Drawing Sheets

(56) References Cited

U.S. PATENT DOCUMENTS

| | | | |
|---|---|---|---|
| 8,392,564 B1* | 3/2013 | Czajkowski | H04L 41/5051 709/226 |
| 8,578,443 B2* | 11/2013 | Narain | G06F 21/629 726/1 |
| 9,038,130 B2 | 5/2015 | Gillon et al. | |
| 9,240,996 B1* | 1/2016 | Sinnema | H04L 63/20 |
| 9,436,820 B1* | 9/2016 | Gleichauf | H04L 63/02 |
| 10,178,132 B2* | 1/2019 | Chahal | G06F 21/44 |
| 2004/0031058 A1* | 2/2004 | Reisman | H04N 21/6587 725/112 |
| 2006/0048142 A1* | 3/2006 | Roese | H04L 63/20 717/176 |
| 2008/0070495 A1* | 3/2008 | Stricklen | H04W 12/06 455/3.01 |
| 2009/0228951 A1* | 9/2009 | Ramesh | H04L 63/0218 726/1 |
| 2010/0257132 A1* | 10/2010 | Collard | G06Q 10/06 706/47 |
| 2011/0023118 A1* | 1/2011 | Wright | G06F 11/28 726/23 |
| 2011/0153854 A1* | 6/2011 | Chickering | H04L 67/146 709/229 |
| 2011/0202453 A1* | 8/2011 | Issa | G06Q 10/00 705/39 |
| 2012/0069749 A1* | 3/2012 | Famolari | G06Q 30/02 370/252 |
| 2012/0216242 A1* | 8/2012 | Uner | G06F 21/50 726/1 |
| 2013/0007245 A1* | 1/2013 | Malik | H04L 41/0816 709/223 |
| 2013/0179938 A1* | 7/2013 | Choi | G06F 21/57 726/1 |
| 2014/0148140 A1* | 5/2014 | Ahn | H04L 41/0893 455/418 |
| 2014/0157353 A1* | 6/2014 | Shim | H04W 12/08 726/1 |
| 2014/0229595 A1* | 8/2014 | Burke | H04L 41/0893 709/223 |
| 2014/0280913 A1* | 9/2014 | Karren | H04L 41/0806 709/224 |
| 2015/0012963 A1* | 1/2015 | Gupta | H04L 63/20 726/1 |
| 2015/0050922 A1* | 2/2015 | Ramalingam | H04W 12/08 455/418 |
| 2015/0106868 A1* | 4/2015 | Lo | G06F 21/32 726/1 |
| 2016/0191567 A1* | 6/2016 | Chahal | H04W 12/00 726/1 |
| 2016/0226705 A1* | 8/2016 | Toner | H04L 67/26 |
| 2016/0242024 A1* | 8/2016 | Karren | H04L 41/0686 |
| 2017/0041344 A1* | 2/2017 | Nandakumar | H04L 63/20 |
| 2017/0250868 A1* | 8/2017 | Keeney | H04L 43/0847 |
| 2017/0272472 A1* | 9/2017 | Adhar | G06F 21/316 |
| 2018/0004937 A1* | 1/2018 | Shannon | G06F 21/51 |
| 2018/0097846 A1* | 4/2018 | Hamilton, II | H05K 999/99 |
| 2018/0131725 A1* | 5/2018 | Kim | H04L 63/20 |
| 2019/0089748 A1* | 3/2019 | Manor | H04L 63/1441 |
| 2019/0095352 A1* | 3/2019 | Poornachandran | G06F 21/53 |
| 2019/0116206 A1* | 4/2019 | Smith | G06F 21/6218 |
| 2020/0021618 A1* | 1/2020 | Smith | H04L 63/20 |

OTHER PUBLICATIONS

M. Uriarte, J. Astorga, E. Jacob, M. Huarte and M. Carnerero, "Expressive Policy-Based Access Control for Resource-Constrained Devices," in IEEE Access, vol. 6, pp. 15-46, 2018. (Year: 2018).*

Ghiani, Giuseppe, et al. "Personalization of context-dependent applications through trigger-action rules." ACM Transactions on Computer-Human Interaction (TOCHI) 24.2 (2017): 1-33. (Year: 2017).*

Andrews et al., "Security Policy Enforcement Based on Dynamic Security Context Updates", U.S. Appl. No. 15/926,551, filed Mar. 20, 2018, DELL:230, 35 pgs.

Microsoft, "System Center 2016 Datasheet", 2016, 2 pgs.

Airwatch, "Mobile Device Management", 2014, 2 pgs.

* cited by examiner

REAL-TIME POLICY SELECTION AND DEPLOYMENT BASED ON CHANGES IN CONTEXT

FIELD

This invention relates generally to information handling systems, and more particularly, to real-time security policy selection and deployment for information handling systems based on changes in context.

BACKGROUND

As the value and use of information continues to increase, individuals and businesses seek additional ways to process and store information. One option available to users is information handling systems. An information handling system (IHS) generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In some cases, a centralized management system may be used to monitor and manage an ecosystem of networked information handling systems. A centralized management system helps to reduce the total cost of ownership associated with the networked systems by increasing the automation of deploying and maintaining them. It also drives conformance to security requirements and reduces the risks associated with networked systems that need to be monitored and protected from unauthorized access or other performance vulnerabilities.

Networked information handling systems, including but not limited to server clusters, network switches, personal computers and printers, have been centrally managed in large enterprises and small or medium businesses for many years using IT-based management frameworks. Mobile information handling systems or devices, one the other hand, are typically managed using a separate mobile device management (MDM) framework, which is well suited to handle wireless and globally distributed devices.

In a typical management environment, a set of policies are applied to an information handling system when the system is first registered/connected to the management framework and added to a domain or registered to a group. Once the initial set of policies are applied, they remain on the IHS over the course of its lifetime or until a system administrator manually applies a different set of policies to the IHS.

SUMMARY OF THE INVENTION

The following description of various embodiments of systems and related methods is not to be construed in any way as limiting the subject matter of the appended claims.

According to one embodiment, a system in accordance with the present disclosure may include a plurality of information handling systems (IHSs) coupled to and managed by a remote management system (RMS). Each IHS may include a policy enforcement engine comprising a first set of program instructions, which are stored within a memory of the IHS and executable by a processing device of the IHS to monitor data pertaining to the IHS, determine if the data triggers one or more events, and transmit a notification if one or more events are triggered. The RMS may include a policy selection engine comprising a second set of program instructions, which are stored within a memory of the RMS and executable by a processing device of the RMS to receive a notification transmitted from at least one IHS, select a policy to be applied to one or more of the IHSs based on the received notification, and transmit the selected policy to the one or more IHSs. The policy enforcement engine of the one or more IHSs may further include a third set of program instructions, which are stored within the memory of the one or more IHSs and executable by the processing device of the one or more IHSs to receive the selected policy from the RMS, store the selected policy within a computer readable storage medium of the one or more IHSs, and perform actions specified by the selected policy when policy rules specified by the selected policy set are violated.

In some embodiments, each IHS further may include one or more data collection modules comprising a fourth set of program instructions, which are stored within the memory of the IHS and executable by the processing device of the IHS to collect the data pertaining to the IHS and provide the collected data to the policy enforcement engine. The data pertaining to the IHS may include, for example, current data and/or historical data pertaining to the IHS.

In some embodiments, the first set of program instructions may be further executable to: compare current data pertaining to the IHS to historical data stored within the IHS; determine that the current data triggers one or more events if the comparison indicates a change in behavior of the IHS or a user of the IHS; and transmit a notification of the behavior change to the remote management system.

In some embodiments, the first set of program instructions may be further executable to: monitor a current network connection, a current physical location or a current security posture of the IHS; determine whether or not the IHS is currently connected to a secure network or unsecure network, currently located in a restricted location, and/or if the security of the IHS has been compromised; and transmit a notification to the remote management system based on the determination.

In some embodiments, the first set of program instructions may be further executable to continually monitor the data pertaining to the IHS and transmit a new notification to the remote management system in response to the continually monitored data triggering one or more events.

In some embodiments, the second set of program instructions may be further executable to: select a first set of policies to be applied to the one or more of the IHSs if the received notification indicates a desirable change in context has occurred within the at least one IHS; and select a second set of policies to be applied to the one or more of the IHSs if the received notification indicates an undesirable change in context has occurred within the at least one IHS. The second set of policies are generally more restrictive than the first set of policies.

In some embodiments, the second set of program instructions may be further executable to: classify policies into groups; specify at least two sets of policies for each of the groups, including a more restrictive policy set and a less restrictive policy set; identify which of the groups the received notification corresponds to; and select, from the identified group, a policy set to be applied to one or more of the IHSs based on the received notification.

A method performed by an information handling system (IHS) coupled to and managed by a remote management system (RMS) is also provided herein. According to one embodiment, such method may generally include: monitoring data pertaining to the IHS, wherein the IHS comprises a policy defining a set of rules and/or restrictions applied to the IHS; and determining if the data triggers one or more events. If the data triggers one or more events, the method may further include: transmitting a notification to the RMS; receiving a new policy from the RMS in response to the notification, where the new policy defines a set of rules and/or restrictions that differ from the set of rules and/or restrictions defined within the policy set; storing the new policy within a memory of the IHS upon said receiving; and performing actions specified by the new policy when one or more of the rules and/or restrictions specified by the new policy are violated.

In some embodiments, said monitoring data pertaining to the IHS may include monitoring at least one of a network connection of the IHS, a physical location of the IHS, and a security posture of the IHS. In such embodiments, said determining may include detecting a change in network connectivity of the IHS, a change in the physical location of the IHS, and a change in security posture of the IHS based on said monitoring.

In some embodiments, said monitoring data pertaining to the IHS may include monitoring current data pertaining to the IHS and comparing the current data to historical data stored within the IHS. In such embodiments, said determining may include detecting a change in behavior based on the comparison.

A method performed by a remote management system (RMS) coupled and configured to manage a plurality of information handling systems (IHSs) operating within a managed environment is also provided herein. According to one embodiment, such method may generally include: receiving a notification transmitted from at least one IHS within the managed environment; selecting a policy set to be applied to one or more of the IHSs based on the received notification; and transmitting the selected policy set to the one or more IHSs.

In some embodiments, said receiving a notification may include receiving a notification of unusual behavior transmitted from the at least one IHS. In some cases, a different notification of unusual behavior may be transmitted by the at least one IHS to the RMS for different types of unusual behavior detected by the at least one IHS. In such embodiments, said selecting a policy set may include selecting a policy set from a plurality of policy sets, each comprising a different set of rules and/or restrictions, based on the type of unusual behavior detected by the at least one IHS and the notification of unusual behavior received from the at least one IHS.

In other embodiments, said selecting a policy set may include selecting between a first set of policies and a second set of policies based on the received notification, wherein the second set of policies is more restrictive than the first set of policies.

In some embodiments, said selecting a policy set may include: selecting the second set of policies to be applied and transmitted to the at least one IHS, if the received notification indicates that the at least one IHS is connected to an unsecure network; and selecting the first set of policies to be applied and transmitted to the at least one IHS, if the received notification indicates that the at least one IHS is connected to a secure network.

In some embodiments, said selecting a policy set may include: selecting the second set of policies to be applied and transmitted to the at least one IHS, if the received notification indicates that the at least one IHS is physically located in a restricted location; and selecting the first set of policies to be applied and transmitted to the at least one IHS, if the received notification indicates that the at least one IHS is not physically located in a restricted location.

In some embodiments, said selecting a policy set may include: selecting the second set of policies to be applied and transmitted to each of the plurality of IHSs, if the received notification indicates that a security posture of at least one IHS is compromised or vulnerable to threats; and selecting the first set of policies to be applied and transmitted to the plurality of IHSs, if the received notification indicates that the security posture of the at least one IHS is secure.

BRIEF DESCRIPTION OF THE DRAWINGS

Other advantages of the present disclosure will become apparent upon reading the following detailed description and upon reference to the accompanying drawings in which.

Figure 1:
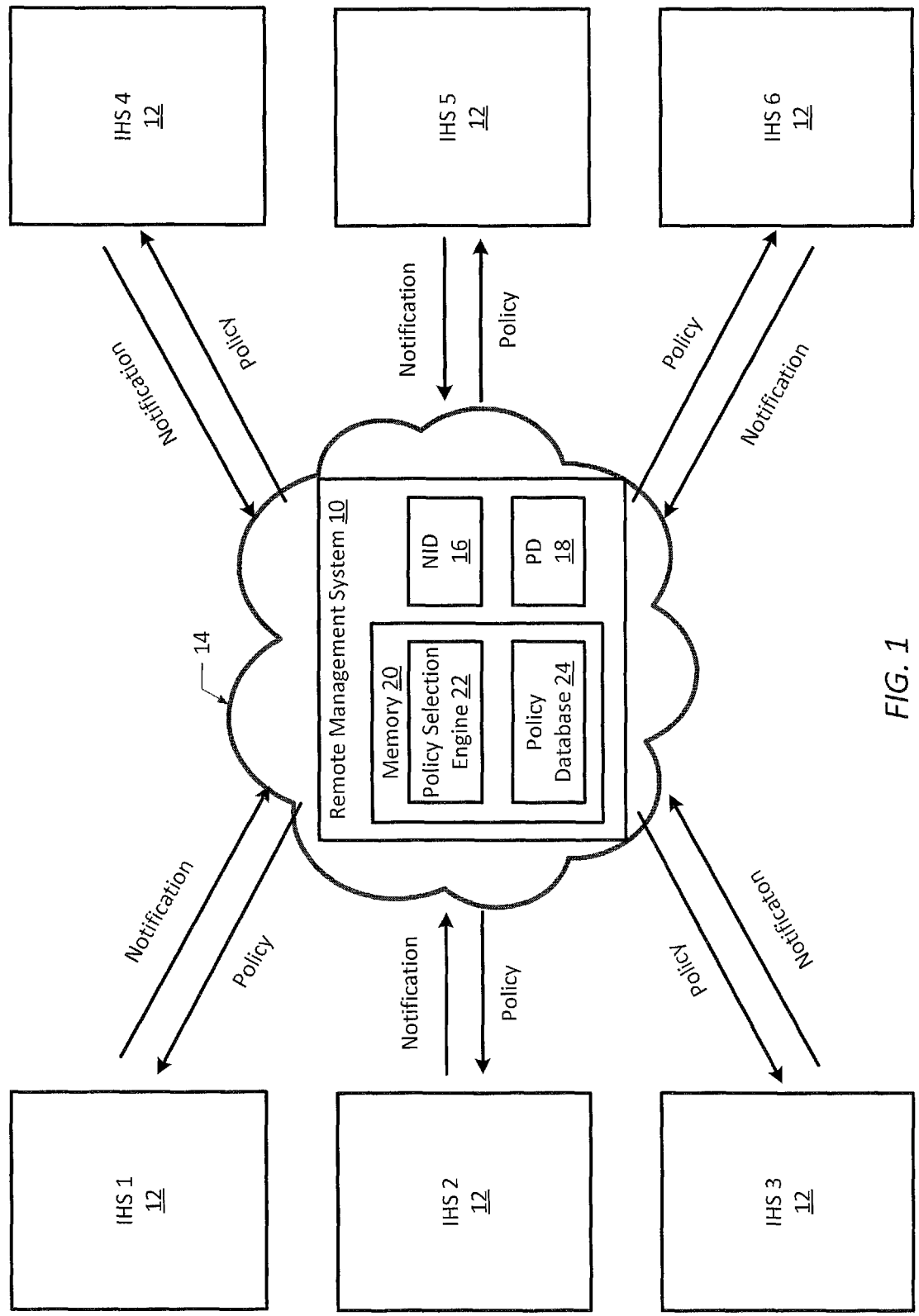
FIG. 1 is a block diagram of a system including a remote management system (RMS) and a plurality of information handling systems (IHSs), which are coupled to and managed by the RMS within a managed environment, according to one embodiment of the present disclosure.

While the present disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the present disclosure is to cover all modifications, equivalents and alternatives falling within the spirit and scope of the present disclosure as defined by the appended claims.

DESCRIPTION OF ILLUSTRATIVE EMBODIMENTS

In conventional management systems, a system administrator may apply a set of policies to an information handling system (IHS) when the IHS is first connected to the management framework and added to a domain or registered to a group. The policies applied to the IHS may define a set of rules and/or restrictions to be applied to the IHS to gain access to the IHS, gain access to one or more computing resources within the IHS, and/or to gain access to data and/or applications stored within the IHS or within another IHS operating within the managed environment. Once the initial set of policies are applied, they remain on the IHS over the lifetime of the IHS, or until the system administrator manually applies a different set of policies to the IHS. In some conventional management systems, a system administrator may be notified that the security posture of the IHS has been compromised, so that the system administrator may take action, e.g., by applying a different set of policies to the IHS. In some conventional management systems, a user may be denied access to the IHS, or applications running on the IHS, until the system administrator takes action to fix the vulnerability. In other conventional management systems, the IHS may remain vulnerable until the system administrator takes action to fix the vulnerability.

Conventional management systems cannot dynamically update or change the set of policies applied to an IHS when the context of the IHS changes. Contextual information pertaining to an IHS may include, but is not limited to, a network connection of the IHS, a physical location of the IHS, security posture of the IHS, operating system version installed on the IHS, user role and/or user behavior. For example, conventional management systems cannot apply a more restrictive policy set to an IHS when the IHS moves from a secure network (e.g., a secure corporate network, such as a wired LAN) to a unsecure network (such as a public access point located, e.g., in a coffee shop), nor can they revert back to a less restrictive policy set when the IHS reconnects to the secure network. Conventional management systems also fail to dynamically update or change the policy set applied to an IHS in response to other contextual changes, such as when the IHS moves between an unrestricted location and a restricted location, when the security posture of the IHS changes, when an IHS within the network becomes compromised (e.g., infected with malicious software) and/or when unusual user or device behavior is detected. In order to maintain user productivity and device/network security, it would be desirable to dynamically update the policy set applied to an IHS in response to changes in user and/or device context and/or behavioral patterns.

The present disclosure is generally directed to management frameworks or systems in which a plurality of information handling systems (IHSs) are coupled to and managed by a remote management system (RMS). More specifically, the present disclosure is directed to various embodiments of systems and methods that may be used to dynamically update a policy set applied to one or more IHSs connected to and managed by a RMS in response to changes in user and/or device context and/or behavioral patterns.

FIG. 1 is a block diagram illustrating one embodiment of a system including a plurality of IHSs 12, each of which is coupled to and managed by a RMS 10. Although six IHSs (e.g., IHS 1 . . . IHS 6) are illustrated in FIG. 1, it is generally understood that substantially any number of IHSs 12 may be coupled to and managed by RMS 10. In FIG. 1, RMS 10 is illustrated as residing within network 14. Network 14 may be a local area network (LAN), wide area network (WAN), personal area network (PAN), or the like. Furthermore, the network connection between the plurality of IHSs 12 and RMS 10 may be wired, wireless or a combination thereof. For purposes of this discussion, network 14 is indicated as a single collective component for simplicity. However, it is appreciated that network 14 may comprise one or more direct connections to other devices, as well as a more complex set of interconnections as can exist within a wide area network, such as the Internet.

Figure 2:
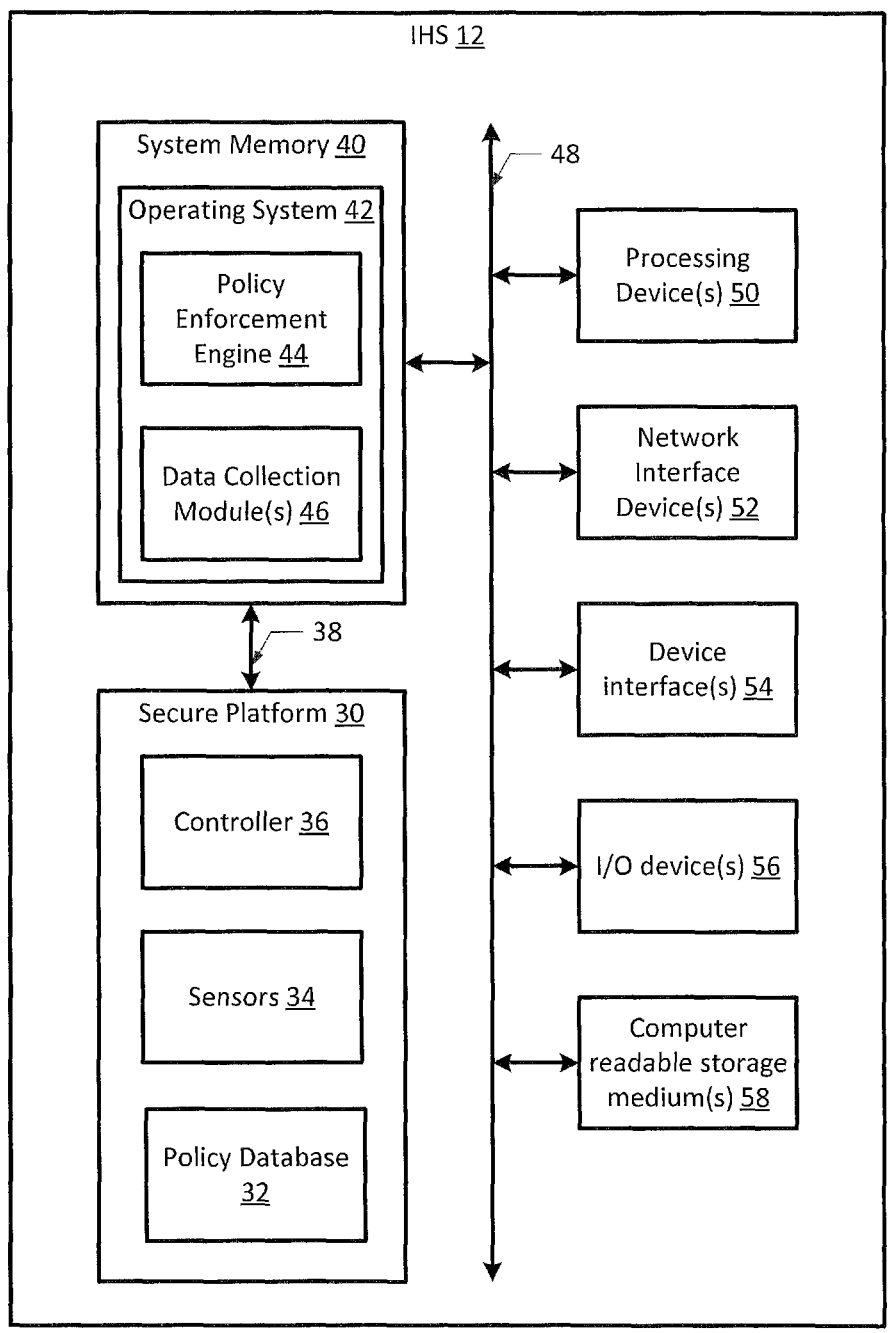
FIG. 2 is a block diagram illustrating various components of an information handling system (IHS), according to one embodiment of the present disclosure.

FIG. 2 is a block diagram illustrating one embodiment of an IHS 12 that may be coupled to and managed by RMS 10 in accordance with the present disclosure. In this regard, it will be understood that the IHS components shown in FIG. 2 are exemplary only. It will be further understood that while certain components of the IHS are shown in FIG. 2 for illustrating embodiments of the present disclosure, the IHS disclosed herein is not restricted to including only those components shown in FIG. 2 and described below.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a peripheral device (e.g., a printer), a network storage device, or any other suitable device and may vary in size, shape, performance, functionality, and price. In some embodiments, an information handling system may include random access memory (RAM), one or more processing resources such as a central processing unit (CPU) or hardware or software control logic, read only memory (ROM), and/or other types of nonvolatile memory. In some embodiments, an information handling system may also include one or more disk drives, one or more network ports for communicating with external devices, and/or various input and output (I/O) devices, such as a keyboard, a mouse, a touch screen and/or a video display. An information handling system may also include one or more buses operable to transmit communications between the various hardware components contained therein.

Referring to FIGS. 1 and 2, a plurality of information handling systems 12 may each be coupled to and managed by RMS 10 via network 14, which as stated above, may comprise a wired and/or wireless connection. Together, RMS 10 and the plurality of IHSs 12 form a management framework or managed environment, in which the policies applied to individual IHSs, groups of IHSs, or all network connected IHSs are selected and dynamically updated by RMS 10 in response to notification(s) received by RMS 10 from one or more of the IHSs 12. As described in more detail below with regard to the example methods shown in FIGS. 3-7, an IHS 12 may transmit a notification to RMS 10 in response to a change in user and/or device context and/or behavioral patterns. Upon receiving a notification from an IHS 12, RMS 10 may select a policy (or a set policies) to be applied to one or more of the IHSs 12 based on the received notification, and may transmit the selected policy to the one or more IHSs for application thereto.

Among other components, RMS 10 may include a network interface device (NID) 16, a processing device (PD) 18 and a non-transitory computer readable memory 20, as shown in FIG. 1. In some embodiments, RMS 10 may be a desktop computer, a laptop computer, a server or a cluster of interconnected servers, and as such, may include additional hardware and/or software components not specifically illustrated in FIG. 1. Only those components necessary to implement embodiments of the present disclosure are shown in FIG. 1 and described herein for purposes of brevity.

Network interface device (NID) 16 enables RMS 10 to communicate with other network connected devices, systems and/or services via network 14 using one or more communication protocols. As noted above, network 14 may be a local area network (LAN), wide area network (WAN), personal area network (PAN), or the like, and the connection between IHSs 12 and RMS 10 may be wired, wireless or a combination thereof. In the embodiment shown in FIG. 1, network interface device 16 may be coupled to receive notifications from, and transmit selected policies to, one or more of the IHSs 12 using any known communication protocol.

Computer readable memory 20 may be any type of non-volatile memory including, but not limited to, read-only memory (ROM), flash memory, non-volatile random access memory (NVRAM), or a computer readable storage device (such as, e.g., a hard disk drive or solid-state drive), and is generally configured to store policy selection engine 22 and policy database 24. Policy selection engine 22 contains program instructions (or computer program code), which may be executed by processing device 18 to perform various steps of the methods disclosed herein. The program instructions contained within policy selection engine 22 may be written using substantially any suitable programming language including, but not limited to, Java, Python, C#, and JavaScript. Processing device 18 may include various types and/or numbers of programmable integrated circuits (e.g., one or more processors, a controller, microcontroller, microprocessor, ASIC, etc.) and/or programmable logic devices (such as a field programmable gate array "FPGA", complex programmable logic device "CPLD", etc.). According to one embodiment, processing device 18 may include one or more central processing units (CPUs), each having one or more processing cores, for executing the program instructions contained within policy selection engine 22.

According to embodiments of the present disclosure, policy selection engine 22 is configured to select a policy (or a set of policies) from policy database 24 to be transmitted and applied to one or more IHSs 12 in response to a notification received from at least one of the IHSs operating within the managed environment. The present disclosure contemplates numerous types of notifications, which may be sent from an IHS 12 to RMS 10. Although not limited to such examples, an IHS may transmit a notification to RMS 10 when the IHS moves between a secure network and an unsecure network, when the IHS moves between an unrestricted location and a restricted location, when the security posture of the IHS changes, when the IHS is compromised (e.g., infected with malicious software) or vulnerable to security threats, and/or when unusual user or IHS behavior is detected. An IHS may transmit different types of notifications, depending on the change in context or behavior detected by the IHS, to RMS 10. Depending on the particular notification received, policy selection engine 22 may select and transmit a new policy (or set of policies) to the IHS that transmitted the notification, to a particular group of IHSs, or to all IHSs within the environment managed by RMS 10.

Policy database 24 is configured to store a plurality of rules and/or restrictions for managing the plurality of IHSs 12 operating within the managed environment. A policy is a computer representation of at least one rule that must be satisfied to gain access to the IHS, gain access to one or more computing resources within the IHS, and/or to gain access to data and/or applications stored within the IHS or within another IHS operating within the managed environment. Some policy rules may be applied globally to all computing resources within an IHS, while other policy rules may be applied to certain computing resources within an IHS, certain classes of data and/or specific data elements stored within an IHS. Some policy rules may be applied to individual IHSs, to groups of IHSs or to all IHSs operating within the managed environment.

As non-limiting examples, policy rules may be used to control access to data stored within a computing resource of the IHS, and/or to control the decryption of encrypted data stored within the computing resource. Other policy rules may be used to control or manage logon security features (e.g., multifactor authentication, user password, etc.), control network access (e.g., to a secure or public Wi-Fi), and control access to local and/or network storage device. In other examples, policy rules may control access to input/output devices of the IHS (e.g., a camera or microphone) or control access to certain applications or websites. In yet another example, policy rules may be used to control power options set for the IHS, such as the amount time an IHS is idle before it transitions into a power saving mode or what happens upon lid closing.

In addition to rules, the policies stored within policy database 24 may specify one or more actions that are taken by an IHS if one or more policy rules are violated. Example actions include, but are not limited to, enabling/disabling I/O devices of the IHS (e.g., blocking phone calls or disabling a camera or microphone), enabling/disabling access to one or more local or remote computing resources of the IHS (e.g., blocking access to a network interface device, a computer readable memory or storage device, a processing device, etc.), enabling/disabling network access (e.g., blocking access to a secure or public Wi-Fi network), and enabling/disabling access to certain applications or websites (e.g., certain applications/websites may be allowed/disallowed for certain users/locations/times). When policy selection engine 22 selects a new policy (or set of policies) in response to a notification received from at least one IHS, the new policy is immediately transmitted and applied to one or more IHSs operating within the managed environment, so that the IHSs can perform the actions specified by the new policy should the new policy rules be violated.

As shown in FIG. 2, an IHS 12 in accordance with the present disclosure may include secure platform 30, system memory 40, and one or more processing devices 50. In addition, IHS 12 may include one or more network interface device(s) 52, one or more device interface(s) 54, one or more I/O device(s) 56 and one or more computer readable storage medium(s) 58. In the embodiment shown in FIG. 2, communication between secure platform 30 and system memory 40 is conducted via a secure, bi-directional communication link 38 (such as, e.g., a Transport Layer Security, TLS, pipe) to ensure that communication there between remains secure. System memory 40, processing device(s) 50, network interface device(s) 52, device interface(s) 54, I/O device(s) 56 and computer readable storage medium(s) 58, on the other hand, are coupled to system interconnect 48 for communicating signals and data there between. System interconnect 48 may represent one or more buses, interfaces, hubs and/or controllers that may be used to transfer information between the system components. Other components not specifically shown in FIG. 2 may also be included within the information handling system.

The one or more processing devices 50 shown in FIG. 2 may be configured to execute program instructions stored within system memory 40 and/or computer readable storage medium 58. Examples of processing device(s) 50 include various types of programmable integrated circuits (e.g., a processor, a controller, microcontroller, microprocessor, ASIC, etc.) and programmable logic devices (such as a field programmable gate array "FPGA", complex programmable logic device "CPLD", etc.). According to one embodiment, processing device(s) 50 may include a central processing unit (CPU) having one or more processing cores. In some embodiments, processing device(s) 50 may include other types of processing devices including, but not limited to, a graphics processor unit (GPU), a graphics-derivative processor (such as a physics/gaming processor), a digital signal processor (DSP), etc.

Network interface device(s) (NID) 52 enables IHS 12 to communicate with other devices, systems and/or services via network 14 using one or more communication protocols. As noted above, network 14 may be a local area network (LAN), wide area network (WAN), personal area network (PAN), or the like, and the connection between IHSs 12 and RMS 10 may be wired, wireless or a combination thereof. In the embodiment shown in FIG. 1, network interface device (s) 52 may be coupled to transmit notifications to, and receive selected policies from, RMS 10 using any known communication protocol.

Device interface(s) 54 may generally include one or more communication interfaces or ports, which provide physical connection to and enable communication with external devices and cables. Examples of device interface(s) 54 include, but are not limited to, a Universal Serial Bus (USB) interface, a card reader, a Personal Computer Memory Card International Association (PCMCIA) port, and a high-definition multimedia interface (HDMI).

Input/Output (I/O) device(s) 56 may include any input device and/or output device provided on, within or coupled to an IHS. Examples of input devices include, but are not limited to, a keyboard, mouse, touch screen, touch pad, microphone, camera, etc. Examples of output devices include, but are not limited to, a computer monitor, display device, printer, audio speaker(s), etc. In some embodiments, I/O device(s) 56 may include one or more optical disc drives, such as a compact disc (CD) drive, digital video (DVD) disc drive and/or Blu-ray disc drive (BD).

Computer readable storage medium 58 is generally configured to store user data and applications. The applications stored within computer readable storage medium 58 may contain program instructions (or computer program code), which may be executed by processing device(s) 50 to perform various tasks and functions for the information handling system and/or for the user. According to one embodiment, computer readable storage medium 58 may comprise one or more hard disk drives (HDDs) or solid-state drives (SSDs).

As shown in FIG. 2, policy database 32, sensors 34 and controller 36 are provided on secure platform 30, and thus, are configured for operating in a secure environment. More specifically, secure platform 30 provides policy database 32, sensors 34 and controller 36 with a secure environment, which is resistant to security attacks and other modifications by isolating these components from other hardware and/or memory components of the IHS. In addition, controller 36 may be directly connected (e.g., wired) to sensors 34 on the secure platform 30, and therefore, may receive an unadulterated stream of data from sensors 34 that cannot be changed or spoofed by malicious software.

Policy database 32 is configured to store the policies applied to IHS 12, including policy rules and corresponding actions to be performed by the IHS when the policy rules are violated. Policy database 32 may be stored within any non-volatile reprogrammable memory, including various types of RAM, ROM and flash memory. In some embodiments, the policies stored within policy database 32 may initially include a default policy (or set of policies), which were applied to the IHS when the IHS was first registered/connected to the management framework. When a new policy (or set of policies) is received from RMS 10, the new policy is immediately stored within policy database 32 and used to manage the IHS.

Sensors 34 may include one or more platform level sensors configured to generate security related data pertaining to the IHS. Sensors 34 may be implemented in hardware and/or software and may be configured to provide substantially any data that is relevant to system security. As non-limiting examples, sensors 34 may be configured to detect a communication state of a network interface device 52 (e.g., detecting network connectivity, or connection to a particular network), a connection state of a device interface 54 (e.g., detecting the presence of a USB drive attached to a USB port), a connection state of a I/O device 56 (e.g., detecting a connection to a printer, camera, microphone, etc.), a physical location of the IHS (e.g., detecting a GPS location of the IHS), a power or docking state of the IHS, and/or an intrusion into a chassis of the IHS. As further examples, sensors 34 may be configured to detect corruption of program code or data within a Basic Input/Output System (BIOS) of the IHS, a measured boot violation (e.g., detecting configuration and/or boot process changes to the IHS), multiple incorrect password attempts, state changes in the Trusted Platform Module (TPM), and/or other hardware-level abnormal behavior (e.g., an uncharacteristically large number of reads/writes to the same memory location). Other types of security related data not specifically mentioned herein may also be generated by sensors 34.

Controller 36 is coupled to receive the security related data from sensors 34. In some embodiments, controller 36 may be directly connected (e.g., wired) to sensors 34 on secure platform 30, and therefore, may be coupled to receive an unadulterated stream of sensor data from sensors 34 that cannot be changed or spoofed by malicious software. In some embodiments, controller 36 may be configured to aggregate the security related data received from sensors 34. In some embodiments, controller 36 may be configured to continuously determine and refresh a security posture of the secure platform 30 based on the security related data received from sensors 34. One manner in which controller 36 may continuously determine and refresh a security posture of the secure platform is described in co-pending U.S. patent application Ser. No. 15/926,551, entitled "SECURITY POLICY ENFORCEMENT BASED ON DYNAMIC SECURITY CONTEXT UPDATES," the entirety of which is incorporated herein in its entirety.

Controller 36 can be implemented in a variety of ways, including hardware, software and/or firmware implementations. In some embodiments, controller 36 may be an embedded controller (EC) or a dedicated microcontroller, which is provided on secure platform 30 and configured to receive security related data from sensors 34. In some embodiments, controller 36 may be configured to determine a security posture of secure platform 30 and provide security posture updates. However, controller 36 is not strictly limited to an EC or dedicated microcontroller and may be replaced with a chipset status register or general purpose I/O (GPIO) pins, which are coupled to receive security related data from sensors 34. Controller 36 is coupled to supply security related data and/or security posture updates to system memory 40. In some embodiments, controller 36 may be coupled to system memory 40 via a secure, bidirectional communications link 38 to ensure that communication there between remains secure. In one example, the secure, bi-directional communication link 38 may be a Transport Layer Security (TLS) pipe.

System memory 40 (e.g., RAM, ROM and/or cache memory) may be configured to store a plurality of software and/or firmware modules, including but not limited to, operating system (OS) 42, policy enforcement engine 44 and data collection module(s) 46. The software and/or firmware modules stored within system memory 40 contain program instructions (or computer program code), which may be executed by processing device(s) 50 to instruct components of IHS 12 to perform various tasks and functions for the information handling system, as well as to perform various steps of the methods disclosed herein. Although illustrated as OS-level services in FIG. 2, it is noted that policy enforcement engine 44 and data collection module(s) 46 may operate outside of the OS, in some embodiments. For example, policy enforcement engine 44 and data collection module(s) 46 may alternatively be stored within computer readable storage medium 58 and executed by processing device(s) 50 to perform various steps of the methods disclosed herein. Alternatively, policy enforcement engine 44 and data collection module(s) 46 may be implemented in firmware on secure platform 30.

Data collection module(s) 46 may generally include one or more data collection modules, which are configured to collect data pertaining to the IHS. In one embodiment, data collection module(s) 46 may contain program instructions (or computer program code), which may be executed by processing device(s) 50 to collect both current data and historical data pertaining to the IHS.

In some embodiments, data collection module(s) 46 may receive security related data and/or security posture updates from sensors 34 and controller 36. For example, data collection module(s) 46 may receive a current GPS location or a current network connection state of the IHS from sensors 34 and controller 36. In addition, or alternatively, data collection module(s) 46 may periodically or continuously receive security posture updates for the secure platform 30 from controller 36.

In some embodiments, data collection module(s) 46 may receive other types of current, platform specific information, including but not limited to, data pertaining to system health, internal temperature, connected peripherals, etc. In some embodiments, data collection module(s) 46 may be configured to collect additional information pertaining to the IHS, and/or additional information pertaining to the user of the IHS, such as software installs and updates (including, e.g., current OS version, anti-virus software installs and updates, and application/software inventory, including application/software known to be vulnerable), memory information, hardware information, application level logs, calendar events, user roles, etc., from operating system 40. Dell Command Module (DCM) is one example of a data collection module, which is installed as an OS-level service on Dell PCs to collect current data pertaining to the PC. Although the DCM may be included and used to collect data pertaining to the IHS in some embodiments, other data collection modules may be used to perform such function in other embodiments.

In some embodiments, data collection module(s) 46 may aggregate the data collected over time into historical data, which may be used to generate user/device behavioral patterns and detect anomalous user/device behavior. In addition to the information described above, data collection module(s) 46 may aggregate and collect historical information pertaining to CPU usage, storage usage, network usage, etc. In addition, data collection module(s) may store historical information on the type of data or classification of data accessed by location, network connection, region, etc., in conjunction with other metrics, such as other data/application accesses, time of day, etc. Dell Data Vault (DDV) is one example of a data collection module, which is installed as an OS-level service on Dell PCs to collect historical data pertaining to the PC, generate user/device behavioral patterns and detect anomalous user/device behavior. Although the DDV may be included and used to collect historical data pertaining to the IHS in some embodiments, other data collection modules may be used to perform such function in other embodiments.

Policy enforcement engine 44 contains program instructions (or computer program code), which may be executed by processing device(s) 50 to monitor the data collected by the data collection module(s) 46, detect changes in user/device context and/or behavioral patterns, transmit notifications to RMS 10 when changes are detected, and immediately update or change policies stored within policy database 32 when new policies are dynamically provided by RMS 10. In some embodiments, policy enforcement engine 44 may be configured to monitor the data collected by the data collection module(s) 46, determine if the data triggers one or more events, and transmit a notification to RMS 10 if one or more events are triggered. If RMS 10 transmits a new policy (or set of policies) to IHS 12 in response to a notification, policy enforcement engine 44 may be additionally configured to receive the new policy transmitted by RMS 10, store the new policy within policy database 32, and perform actions specified by the new policy when policy rules specified therein are violated.

The present disclosure contemplates various embodiments of methods that may be used to dynamically update a policy (or a set of policies) applied to one or more IHSs 12 connected to and managed by a RMS 10 in response to changes in user/device context and/or behavioral patterns. Example embodiments of the methods contemplated herein are illustrated in the flow chart diagrams of FIGS. 3-7.

Generally speaking, the methods contemplated herein are computer implemented methods performed, at least in part, by execution of the program instructions contained within policy enforcement engine 44 of IHS 12 and policy selection engine 22 of RMS 10. Unlike conventional management systems, which either fail to update policies applied to an IHS when context changes occur, or require manual input from a system administrator to do so, the computer implemented methods described herein improve the way in which an IHS functions by dynamically updating a policy applied to the IHS in response to changes in user/device context and/or behavioral patterns. By dynamically updating the applied policies as context changes occur, the systems and methods described herein maintain user productivity without adversely affecting device/network security.

Figure 3:
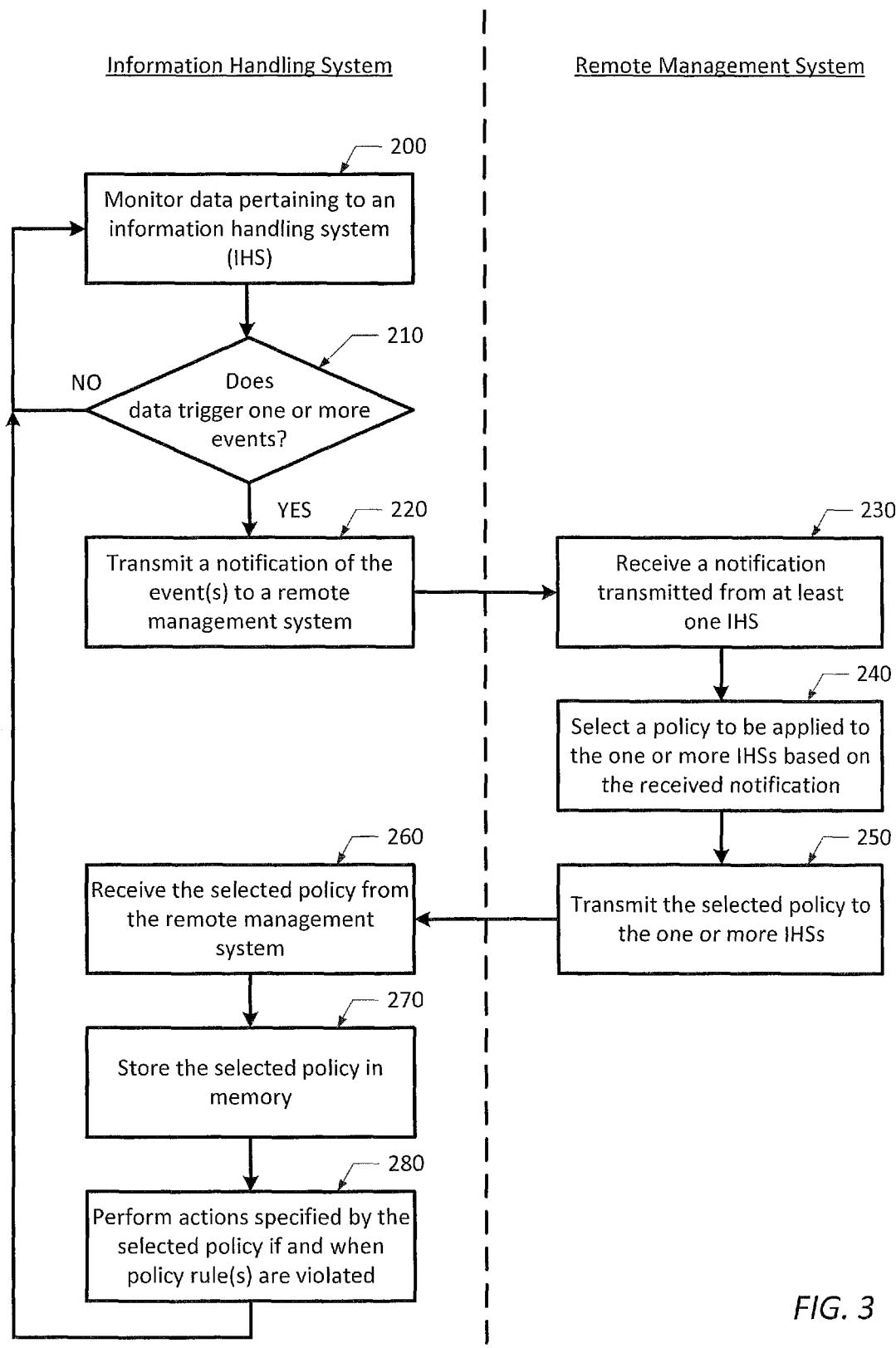
FIG. 3 is a flowchart diagram illustrating one embodiment of a method to dynamically update a policy applied to one or more IHSs operating within a managed environment in response to changes in user/device context and/or behavior.

FIG. 3 illustrates a general embodiment of a method, which may be used to dynamically update a policy applied to one or more IHSs operating within a managed environment, in response to changes in user/device context and/or behavioral patterns. In FIGS. 4-7, example methods are provided to illustrate how a policy applied to one or more IHSs may be dynamically updated in response to particular changes in context and/or behavior, such as when unusual user and/or device behavior is detected (FIG. 4), when an IHS connects to an unsecure network verses a secure network (FIG. 5), when an IHS moves between a restricted location and an unrestricted location (FIG. 6), and when an IHS within the managed environment is determined to be compromised or vulnerable to threats (FIG. 7). Although particular examples are provided herein to explain various aspects of the present disclosure, one skilled in the art would understand how the applied policies could be dynamically updated in response to changes in other types of user/device context and/or behavioral patterns.

In the flow chart diagrams shown in FIGS. 3-7, the methods steps are divided into steps performed by an information handling system and steps performed by a remote management system. While the information handling system and remote management system depicted in FIGS. 3-7 may be generally configured as shown in FIGS. 1 and 2, they are not strictly limited to such configurations, and may be alternatively configured in other embodiments.

In the general methodology shown in FIG. 3, an information handling system monitors data pertaining to the IHS (in step 200), determines if the data triggers one or more events (in step 210) and transmits a notification of the event(s) to the remote management system (in step 220) if at least one event is triggered. In some embodiments of the method disclosed herein, policy enforcement engine 44 of IHS 12 may monitor current and/or historical data collected by data collection module(s) 46 (in step 200) and may use the data to detect one or more events (in step 210). Example events that may be detected or trigged in step 210 include, but are not limited to, unusual user/device behavior, a connection to an unsecure network, an indication that the IHS is currently located in a restricted location, an indication that the IHS is currently located in a location or connected to a network with recent infections (e.g., WannaCry), and/or an indication that the IHS is compromised or vulnerable to security threats.

In some embodiments, each event listed above may have an inverse event, which may also be triggered in step 210. Examples of inverse events include, but are not limited to, typical user/device behavior, a connection to a secure network, an indication that the IHS is not currently located in a restricted location or infected location/network, and an indication that the IHS is not compromised or vulnerable to security threats. By detecting inverse events as well as events (each of which may be referred to herein as "events"), the method shown in FIG. 3 enables more restrictive policies to be applied to an IHS when undesirable changes in context occur (e.g., when connection to an unsecure network is detected), while allowing the IHS to revert back to less restrictive policies when desirable changes in context occur (e.g., when the IHS reconnects to a secure network).

Policy enforcement engine 44 may continue to monitor data pertaining to the IHS (in step 200) if the data does not trigger an event (NO branch of step 210). However, if at least one event is triggered (YES branch of step 210), policy enforcement engine 44 transmits a notification of the event(s) to the remote management system (in step 220). In some embodiments, a notification may be transmitted in step 220 when only one event is triggered. In other embodiments, an accumulation or a series of events may result in a notification being transmitted to the remote management system in step 220. In general, the notification may identify the event(s) detected in step 210, and in some cases, the severity of the event. For example, different types of notifications may be transmitted in step 220 for different types of unusual behaviors or threats identified in step 210.

In step 230, the remote management system may receive a notification transmitted from at least one of the IHSs operating within the managed environment. Upon receiving the notification(s), the remote management system may select a new policy (or set of policies) to be applied to one or more IHSs based on the received notification (in step 240) and may transmit the selected policy to the one or more IHSs (in step 250). In some embodiments of the disclosed method, method steps 230, 240 and 250 may be performed by, or under the control of, policy selection engine 22 of RMS 10, as shown in the embodiment of FIG. 1.

The selection of a particular policy in step 240 is generally based on the notification received in step 230. In some cases, the remote management system may select a more restrictive policy to be applied to one or more IHS s, if the notification received in step 230 indicates that an undesirable change in context has occurred within at least one IHS operating within the managed environment. In other cases, the remote management system may select a less restrictive policy to be applied to one or more IHSs, if the notification received in step 230 indicates that a desirable change in context has occurred within at least one IHS. As used herein, a "more restrictive policy" is one which places a greater number of rules and/or restrictions on an IHS, whereas a "less restrictive policy" places fewer rules and/or restrictions on the IHS. In some embodiments, the policy selected in step 240 may be selected from a large plurality of policy sets, each having a different set of rules and/or restrictions. In other embodiments, selection of a policy in step 240 may be made between a first set of policies and a second set of policies, where the second set of policies is more restrictive than the first set of policies.

In some embodiments, the selected policy may be transmitted (in step 250) to the IHS that provided the notification to the remote management system. In other embodiments, the selected policy may be transmitted (in step 250) to a group of IHSs having a common trait or classification. For example, if an undesirable event is detected within a particular type or model of IHS (e.g., a particular laptop model), a more restrictive policy may be transmitted (in step 250), not only to the IHS in which the undesirable event was detected, but also to a designated group of IHSs having the same type or model. In doing so, the method may preempt security threats or other issues within the group before they occur. In yet other embodiments, the selected policy may be transmitted (in step 250) to all IHSs operating within the managed environment. For example, if malicious software is detected within one of the IHSs, a more restrictive policy may be transmitted (in step 250) to all IHSs operating within the managed environment to prevent the malicious software from spreading.

In step 260, an information handling system receives the policy selected by the remote management system in step 240, stores the selected policy set in memory (e.g., within policy database 32, FIG. 2) in step 270 and performs actions specified by the selected policy in step 280 if and when policy rule(s) specified in the policy are violated. In some embodiments of the disclosed method, method steps 260, 270 and 280 may be performed by, or under the control of, policy enforcement engine 44 of IHS 12, as shown in the embodiment of FIG. 2.

The present disclosure contemplates and encompasses an innumerable variety of actions that can be performed in step 280 when policy rule(s) specified in the selected policy are violated. Examples of actions that may be performed in step 280 include, but are not limited to, disabling one or more I/O devices of the IHS (e.g., disabling cameras or microphones to prevent recording); blocking phone calls or access to certain websites; imposing more restrictive login procedures (e.g., multi-factor authentication) when logging into corporate websites; restricting access to shared network drives/resources; preventing a user of the IHS from downloading confidential documents; changing configuration settings in security products to operate in a more secure mode in less secure environments, etc. Although examples of actions are provided herein to explain various aspects of the present disclosure, one skilled in the art would understand how other actions specified in the selected policy set could be performed in step 280 to maintain user productivity without adversely affecting device/network security.

After a policy is selected by the remote management system and applied to the information handling device, the IHS continues to monitor data pertaining to the IHS in step 200 as discussed above. If the data triggers an event in step 210 indicating a desirable change in context has occurred (e.g., the IHS reconnects to a secure network), the IHS may transmit a notification of the event to the remote management system in step 220, thereby enabling the remote management system to select and revert back to less restrictive policy for the IHS, a particular group of IHSs or all IHSs in the managed environment. As such, the system and method disclosed herein enables the RMS and the IHSs to dynamically switch between more restrictive/less restrictive policies in order to keep the user most productive and the device/network most secure. In other words, the system and method disclosed herein strikes a balance between the restrictiveness of the policies applied to the IHSs operating within the managed environment and usability of the device/network.

In some embodiments, the determination made by the remote management system regarding the restrictiveness of the policy applied to one or more IHSs may not be limited to the data obtained from a single IHS. In some embodiments, for example, the policy selection engine 22 of RMS 10 may collect and analyze data (e.g., OS version, software/applications running, antivirus assigned security score, etc.) from multiple IHSs operating in a particular environment (e.g., location, network, etc.), and may use the data collected from all such IHSs to determine a risk factor of the environment and the restrictiveness of policy to be applied to all devices in that environment. For example, if there is a spread of ransomware (e.g., WannaCry) or other malicious software over a particular location, policy selection engine 22 of RMS 10 may apply anti-virus or malware preventative policy to all devices in that location to prevent the infection and spread. In one example, the preventative policy could change a configuration setting in a security product (e.g., Cylance) to operate in a more secure mode. In such embodiments, the policy selection engine 22 of RMS 10 may be configured to receive data collected by the data collection module(s) 46 of a plurality of IHSs 12, not just notification(s) that a problem or event was detected.

Figure 4:
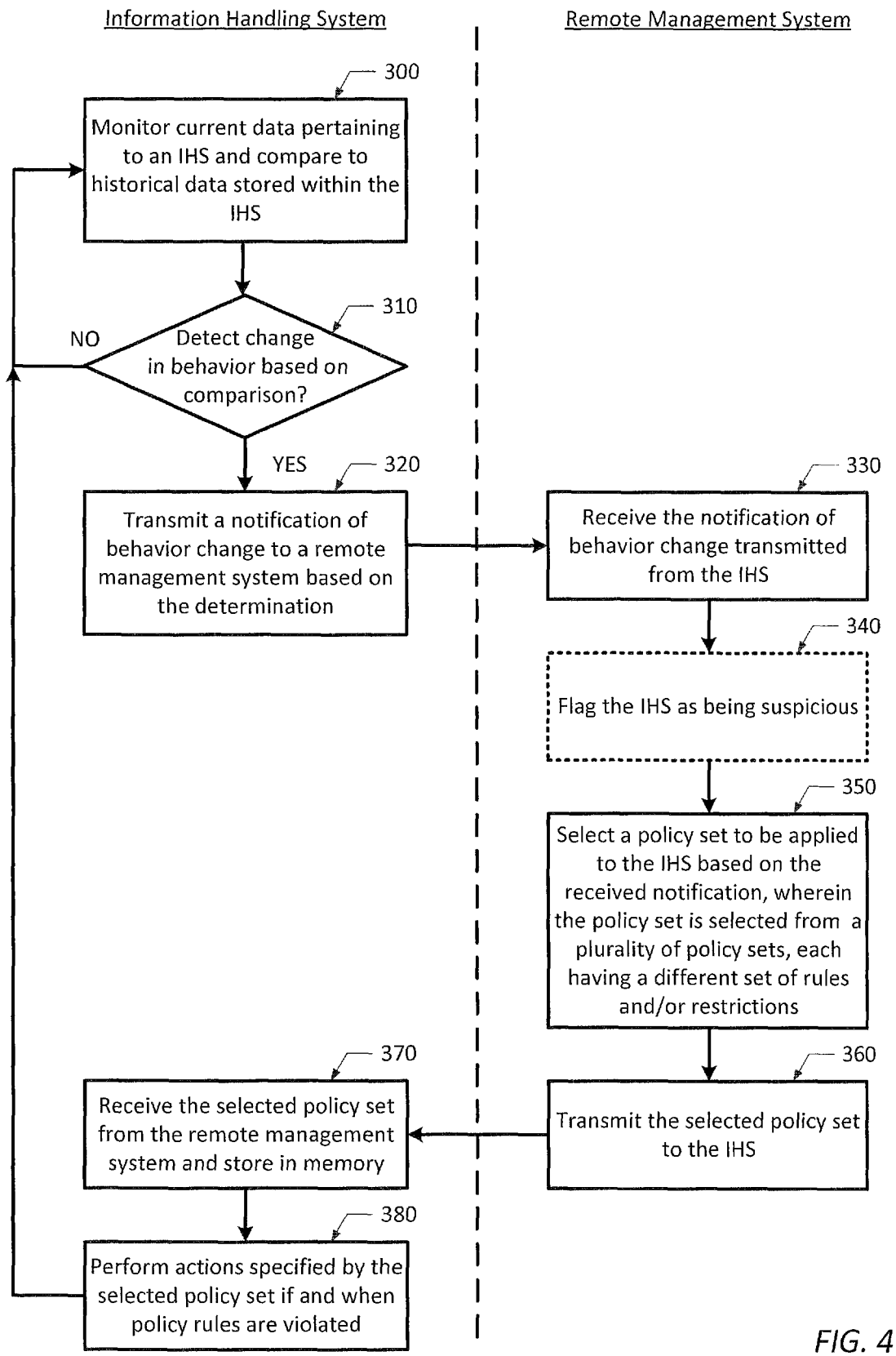
FIG. 4 is a flowchart diagram illustrating one embodiment of a method to dynamically update a policy applied to an IHS operating within a managed environment in response to a change in user/device behavior.

FIG. 4 is a flowchart diagram illustrating one embodiment of a method to dynamically update a policy applied to an IHS operating within a managed environment in response to a change in user/device behavior. Many of the method steps shown in FIG. 4 are similar to those shown in FIG. 3 and discussed above. FIG. 4 is provided to explain how the general methodology may be applied when user/device behavior differs from historical behavior patterns. As noted above with regard to FIG. 3, the method steps shown to be performed by the information handling system in FIG. 4 may be performed by or under the control of policy enforcement engine 44 of IHS 12 (FIG. 2), whereas the method steps shown to be performed by the remote management system in FIG. 4 may be performed by or under the control of policy selection engine 22 of RMS 10 (FIG. 1).

In the embodiment shown in FIG. 4, an IHS operating within the managed environment monitors current data pertaining to the IHS and compares the current data to historical data stored within the IHS (in step 300) to detect a change in user/device behavior (in step 310). In some embodiments, the historical data may represent a behavioral pattern of typical user/device behavior or use. For example, the current physical location (e.g., a GPS location) of an IHS may be monitored and compared to a historical listing of past locations to determine if the current physical location is normal for that IHS or abnormal. In another example, the state of an I/O device (e.g., a camera or microphone) associated with an IHS may be monitored when a particular application (e.g., Skype) is not running and compared to a historical listing of I/O device states to determine if it is normal or abnormal for the I/O device to be in use when the particular application is not running. If a change in behavior is not detected (NO branch of step 310), the IHS may continue to monitor current data and compare the current data to historical data in step 300.

However, if a change in behavior is detected (YES branch of step 310), the IHS may transmit a notification of the behavior change to the remote management system in step 320. In some embodiments, a notification may be transmitted in step 320 in response to detecting a change in a single behavior pattern. In other embodiments, an accumulation or a series of behavior changes may result in a notification being transmitted to the remote management system in step 320. The notification transmitted in step 320 may identify the change in behavior detected in step 310, and in some cases, the severity of the behavior change. In some embodiments, different types or levels of notifications may be transmitted in step 320 for different types of behaviors identified in step 310. For example, different types or levels of notifications may be transmitted for excessive network usage (e.g., to a particular IP address or country), frequent access to blacklisted domains, excessive access to a particular storage device or drive, and other anomalous, out of the ordinary behaviors.

In step 330, the remote management system receives the notification transmitted from the IHS (in step 320). In some embodiments or situations, the remote management system may flag the IHS as being suspicious (in optional step 340) if the received notification indicates that the behavior is unusual for the IHS or the user of the IHS. In step 350, the remote management system may select a new policy (or set of policies) to be applied to the IHSs based on the received notification, where the policy is selected from a plurality of policy sets, each having a potentially different set of rules and/or restrictions. Once a particular policy (or set of policies) is selected, the remote management system may transmit the selected policy to the IHS (in step 360).

The selection of a particular policy in step 350 is generally based on the notification received in step 330. In some cases, the remote management system may select a more restrictive policy to be applied to one or more IHS s, if the notification received in step 330 indicates that an undesirable change in behavior has occurred within the IHS. In other cases, the remote management system may select a less restrictive policy to be applied to the IHS, if the notification received in step 330 indicates that a desirable change in behavior has occurred within the IHS. Since an innumerable variety of behaviors, both for the IHS and the user of the IHS, may be considered in the present method, the policy selected in step 350 may be selected from a large plurality of policy sets, each having a potentially different set of rules and/or restrictions to govern device/user behavior.

In step 370, the IHS receives the policy selected by the remote management system in step 350, and stores the selected policy set in memory (e.g., within policy database 32, FIG. 2) in step 370. In step 380, the IHS may perform actions specified by the selected policy if and when policy rule(s) specified in the policy are violated. As noted above, the present disclosure contemplates and encompasses an innumerable variety of actions that can be performed in step 380 when policy rule(s) specified in the selected policy are violated. For example, if current or historical data indicates that the IHS is currently (or was previously) in a foreign country, and step 310 determines that it is unusual behavior for the IHS to be located in the foreign country, a more restrictive policy may be selected in step 350 and appropriate actions may be taken in step 380 to increase the security of the IHS or prevent access to certain computing resources of the IHS. In another example, if step 310 determines that it is unusual for a camera and/or microphone of an IHS to be "on" when a video conferencing application (e.g., Skype) is not running, a more restrictive policy may be selected in step 350 and appropriate actions may be taken in step 380 to disable the camera and/or microphone (or alternatively, lock down the IHS) to prevent video/audio recording.

After a policy is selected by the remote management system and applied to the information handling device, the IHS continues to monitor current data pertaining to the IHS and compare the current data to historical data in step 300 as discussed above. If the comparison indicates that an undesirable behavior is no longer detected, or detects a desirable behavioral change, the IHS may transmit a notification of the behavior change to the remote management system in step 320, thereby enabling the remote management system to remove the more restrictive policy and revert back to a less restrictive policy for the IHS.

Figure 5:
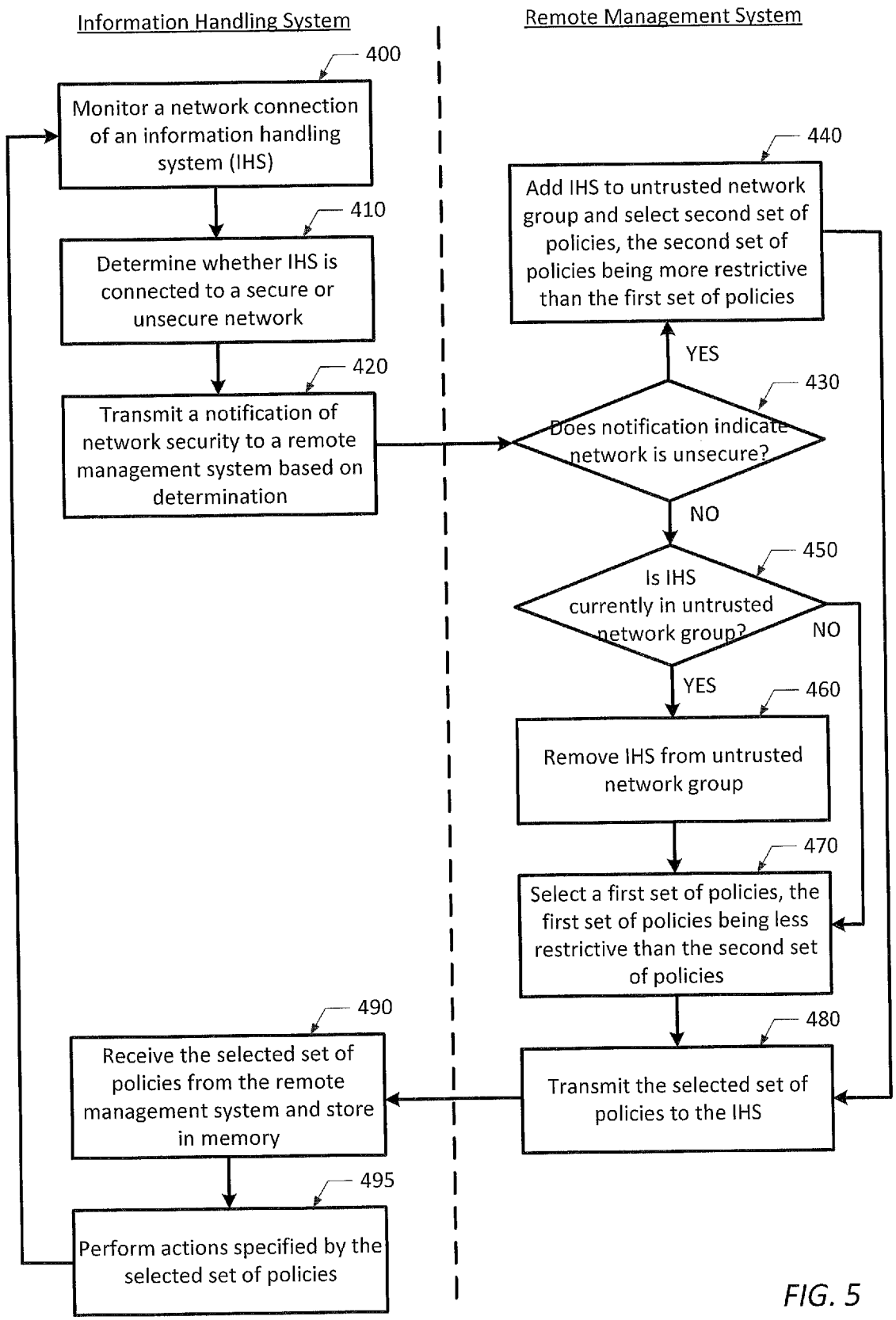
FIG. 5 is a flowchart diagram illustrating one embodiment of a method to dynamically update a policy applied to an IHS operating within a managed environment in response to a change in network connectivity of the IHS.
Figure 6:
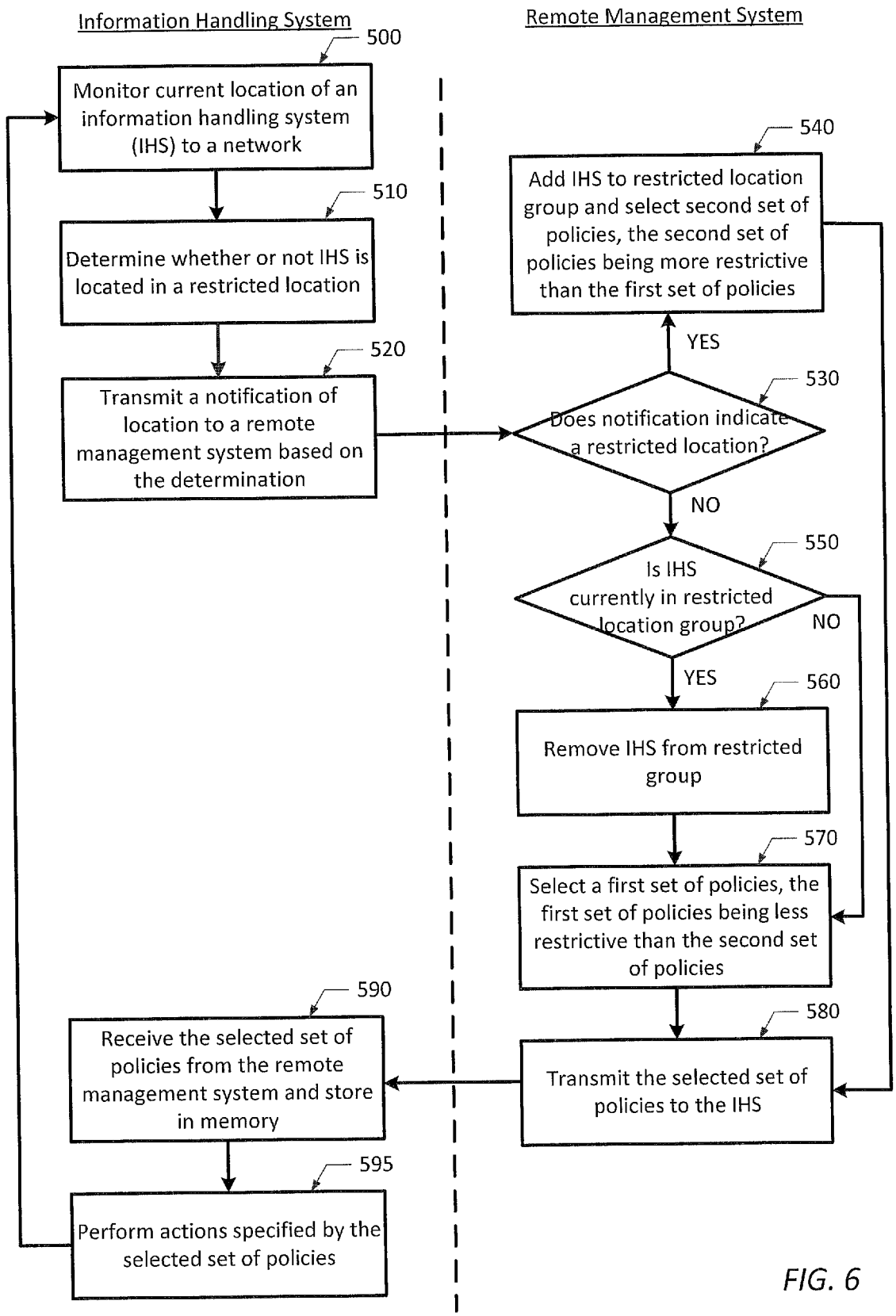
FIG. 6 is a flowchart diagram illustrating one embodiment of a method dynamically update a policy applied to an IHS operating within a managed environment in response to a change in a physical location of the IHS.
Figure 7:
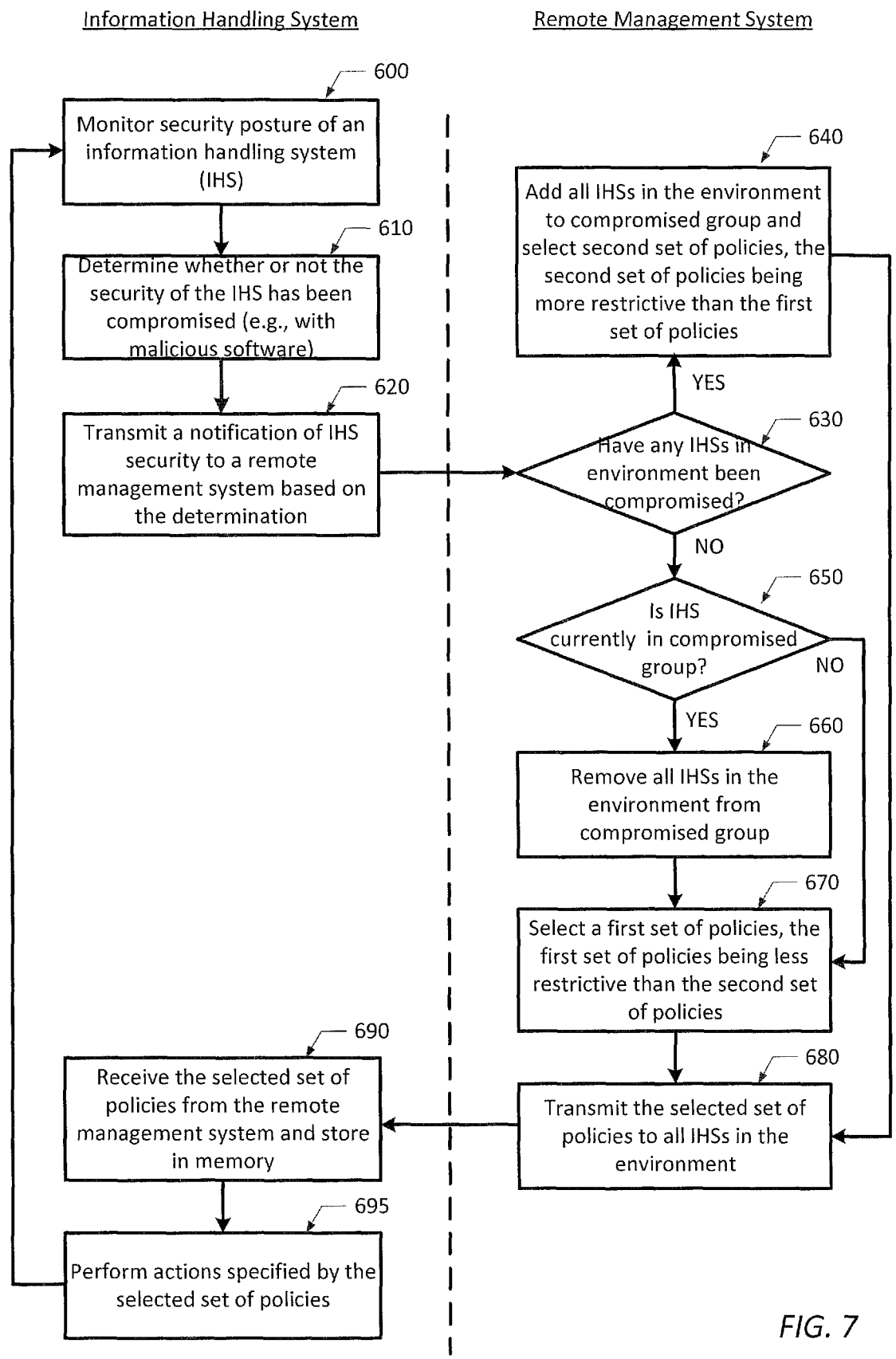
FIG. 7 is a flowchart diagram illustrating one embodiment of a method to dynamically update a policy applied to an IHS operating within a managed environment in response to a change in device/network security.

FIGS. 5-7 illustrate various embodiments of methods that may be performed to dynamically update a policy applied to one or more IHSs operating within a managed environment in response to a change in network connectivity, a change in the physical location of the IHS, and a change in device/network security, respectively. Many of the method steps shown in FIGS. 5-7 are similar to those shown in FIG. 3 and discussed above. As noted above with regard to FIG. 3, the method steps shown to be performed by the information handling system in FIGS. 5-7 may be performed by or under the control of policy enforcement engine 44 of IHS 12 (FIG. 2), whereas the method steps shown to be performed by the remote management system in FIGS. 5-7 may be performed by or under the control of policy selection engine 22 of RMS 10 (FIG. 1).

In one respect, the method embodiments shown in FIGS. 5-7 differ from the embodiments shown in FIGS. 3-4 by classifying policies into groups, specifying at least two sets of policies (e.g., a more restrictive policy and a less restrictive policy) for each group, identifying which of the groups the received notification corresponds to, and selecting, from the identified group, a policy set to be applied to one or more of the IHSs based on the received notification.

For example, the method shown in FIG. 5 is provided to explain how the general methodology shown in FIG. 3 may be applied when an IHS connects to an untrusted network and is added to an untrusted network group having more restrictive policies associated therewith, or connects to a trusted network and is added to a trusted network group having less restrictive policies associated therewith. Similar methods are shown in FIGS. 6 and 7 to explain how the general methodology shown in FIG. 3 may be applied when an IHS is currently located within a restricted location vs an unrestricted location (FIG. 6), and when the IHS/managed environment is determined to be compromised/vulnerable vs secure (FIG. 7).

Referring to the example embodiments shown in FIGS. 5-7, an information handling system may monitor a network connection of the IHS (in step 400), a physical location of the IHS (in step 500) or a security posture of the IHS (in step 600), and determine whether the IHS is connected to a secure or unsecure network (in step 410), whether the IHS is currently located in a restricted or unrestricted location (in step 510), or whether the IHS has been compromised or is vulnerable to threats (in step 610). Based on such determination, the IHS may transmit a notification of network security (in step 420), a notification of location (in step 520), or a notification of compromise (in step 620) to the remote management system.

For example, the IHS may determine that it is connected to a secure network in step 410 if it is connected to a secure, wired or wireless local area network protected by a firewall and other security measures (e.g., a secure corporate network). Alternatively, the IHS may determine that it is connected to an unsecure network in step 410 if it is connected to an open, public Wi-Fi network (e.g., to a Wi-Fi hotspot in a coffee shop).

In step 510, the IHS may determine that is currently located in a restricted location, for example, if current data pertaining to the IHS or user (e.g., GPS location, calendar events, user roles, etc.) indicates that the IHS is currently located in an unauthorized building, an unauthorized room or in a sensitive meeting occurring, e.g., within a particular room at a particular day/time for certain employees or user roles (e.g., high level executives). Other examples of restricted locations may include unauthorized geographical locations, such as blacklisted cities, states and/or countries. Alternatively, the IHS may determine that is currently located in an unrestricted location in step 510 if current data pertaining to the IHS or user indicates that the IHS is not currently located in one of the restricted locations.

In some embodiments, network information can be monitored in step 600 to determine the security posture in step 610. For example, network information can be monitored to determine if the IHS is connected to a secure or public Wi-Fi network, or if the IHS is connected to multiple networks simultaneously. In addition, or alternatively, IP address and/or geographical location (or other location information) may be monitored and used to determine security posture of the IHS. In step 610, the IHS may determine that the security of the IHS has been compromised (or is vulnerable to threats) if malicious software or software known to be vulnerable is detected within a storage medium of the IHS, or if the IHS is connected to a vulnerable network (e.g., which has infected systems on it). Alternatively, the IHS may determine that is secure in step 610 if no security threats are found.

Upon receiving the notification from the IHS, the remote management system makes a determination about the notification. For example, the remote management system may determine whether the notification indicates that: the network is unsecure (in step 430), the IHS is located in a restricted location (in step 530), or if any IHSs within the managed environment have been compromised (in step 630). If the answer in steps 430 or 530 is "YES," the remote management system adds the IHS to an untrusted network group (in step 440) or to a restricted location group (in step 540). In the answer in step 630 is "YES," the remote management system adds all IHSs in the managed environment to a compromised group (in step 640). Once added to the untrusted network group, restricted location group or compromised group, the remote management system selects a second set of policies to be applied to the IHS (in steps 440 and 540) or to all IHSs in the managed environment (in step 640). The second set of policies is generally more restrictive than would otherwise be applied if the IHS were connected to a secure network, located within an unrestricted location or determined to be secure.

Examples of a second set of policies that may be selected in step 440 when the IHS is added to an untrusted network group include, but are not limited to, requiring the user of the IHS to use multi-factor authentication when logging in to corporate websites, restricting access to shared network drives/resources, and/or preventing the user from downloading confidential documents. The second set of policies selected in step 440 may additionally or alternatively include any of the more restrictive policies discussed above.

Examples of a second set of policies that may be selected in step 540 when the IHS is added to a restricted location group include, but are not limited to, disabling one or more I/O devices (e.g., a camera and/or microphone) of the IHS, blocking phone calls, and/or blocking access to certain applications, websites or IP addresses. The second set of policies selected in step 540 may additionally or alternatively include any of the more restrictive policies discussed above.

Examples of a second set of policies that may be selected in step 640 when all IHSs operating within the managed environment are added to a compromised group include, but are not limited to, changing configuration settings in security products to operate in a more secure mode, and applying anti-virus or malware preventative policy to all IHSs within the managed environment to prevent the infection and spread of malicious software. The second set of policies selected in step 640 may additionally or alternatively include any of the more restrictive policies discussed above.

If the answer in steps 430/530/630 is "NO," the remote management system determines whether the IHS is currently in: an untrusted network group (in step 450), a restricted location group (in step 550), or a compromised group (in step 650). If the answer in steps 450/550/650 is "NO," the remote management system selects a first set of policies, which are less restrictive than the second set of policies, to be applied to the IHS (in steps 470 and 570) or to all IHSs in the managed environment (in step 670). If the answer in steps 450/550/650 is "YES," the remote management system removes the IHS from the untrusted network group or the restricted location group (in steps 460 and 560), or removes all IHSs in the managed environment from the comprised group (in step 660), prior to selecting the first set of policies in steps 470/570/670.

Examples of a first set of policies that may be selected in step 470 when the IHS is added to a trusted network group (and/or removed from the untrusted network group) include, but are not limited to, reverting to less secure login procedures when logging in to corporate websites, allowing access to shared network drives/resources, and/or allowing the user to download confidential documents. Additionally, or alternatively, step 470 may remove a more restrictive set of policies previously applied to the IHS or revert back to a default set of policies applied to the IHS.

Examples of a first set of policies that may be selected in step 570 when the IHS is added to an unrestricted location group (and/or removed from the restricted location group) include, but are not limited to, enabling one or more I/O devices (e.g., a camera and/or microphone) of the IHS, enabling phone calls, and/or enabling access to certain applications, websites or IP addresses. Additionally, or alternatively, step 570 may remove a more restrictive set of policies previously applied to the IHS or revert back to a default set of policies applied to the IHS.

Examples of a first set of policies that may be selected in step 670 when all IHSs operating within the managed environment are added to a secure group (and/or removed from the compromised group) include, but are not limited to, changing configuration settings in security products to operate in a less secure mode, remove anti-virus or malware preventative policies and/or turn off advanced antivirus features, allow access to network locations, allow access to storage locations, etc. Additionally, or alternatively, step 670 may remove a more restrictive set of policies previously applied to the IHS or revert back to a default set of policies applied to the IHS.

The remote management system transmits the selected set of policies to the IHS in steps 480/580 and transmits the selected set of policies to all IHSs in the managed environment in step 680. In steps 490/590/690, the IHS(s) receive the selected set of policies transmitted by the remote management system and store the selected set of policies in memory (e.g., within policy database 32 of FIG. 2). In steps 495/595/695, the IHS(s) may perform actions specified by the selected policy if and when policy rule(s) specified in the policy are violated.

The actions performed in steps 495/595/695 generally depend on the change in context and/or behavior detected in steps 410/510/610 and the resulting policy set received from the remote management system in steps 490/590/690. In some cases, different actions may be taken when the IHS is located in a foreign country, which may have different regulation/privacy laws than the US, compared to actions performed when the IHS is located in the US. Such actions may include, but are not limited to, any of the more restrictive policy actions described above, such as limiting user or system access to certain resources like Wi-Fi network, storage locations, camera, microphone, etc. In addition, different actions may be performed when a user of the IHS is connected to and working from a secure corporate network vs working from home or from a public location/network. Such actions may include, but are not limited to, any of the less restrictive policy actions described above, such as not restricting user or system access to certain resources. Furthermore, different actions may be performed when a user of the IHS is attending a high level executive meeting. Such actions may include, but are not limited to, blocking phone calls, disabling a camera and/or microphone to prevent recording, blocking certain websites, etc. Moreover, different actions may be performed for different types of unusual user/device behavior. For example, cameras and/or microphones may be disabled unless a video conferencing application (e.g., Skype) is running on the IHS. In some cases, time base policies may be applied and corresponding actions performed. For example, certain websites may only be accessed during office hours on week days from an IHS connected to a secure corporate network, a home network or an open, public network.

After a policy is selected by the remote management system and applied to one or more IHSs in steps 490/590/690, the IHS continues to monitor a network connection of the IHS (in step 400), a physical location of the IHS (in step 500), or a security posture of the IHS (in step 600), as discussed above. If the IHS determines that the network connection, physical location or security posture of the IHS has changed, the IHS may transmit a notification of the change to the remote management system in steps 420/520/620, thereby enabling the remote management system to dynamically change the policy applied to one or more IHSs in steps 430-480/530-580/630-680.

In addition to other advantages that may be apparent to a skilled artisan having the benefit of this disclosure, the system and methods described herein improve upon conventional management systems by providing dynamic (e.g., real time) selection and deployment of policy based on changes in device/user context and/or behavior. This includes, for example, automated selection and deployment of more restrictive policies to one or more IHSs when undesirable changes in context/behavior occur, and automatic removal of the more restrictive policies when desirable changes in context/behavior occur. Other advantages provided by the systems and methods described herein include selecting such policies based on current and/or historical data obtained from one or more the IHSs operating within the managed environment. In some cases, the data collected from one or more of the IHSs may be analyzed to determine the security risk of IHSs, or the entire managed environment, and appropriate policies may be applied to keep the IHS s/managed environment secure, while keeping employees or users productive.

It will be understood that one or more of the tasks, functions, or methodologies described herein may be implemented, for example, as firmware or as a computer program of instructions, which are embodied in a non-transitory tangible computer readable medium and executed by one or more processing devices. The computer program of instructions may generally include an ordered listing of executable instructions for implementing logical functions within the IHS, or within a component thereof. The executable instructions may include a plurality of code segments operable to instruct components of the information handling system to perform the methodologies disclosed herein. It will also be understood that one or more steps of the present methodologies may be employed in one or more code segments of a computer program. For example, a code segment executed by the information handling system may include one or more steps of the disclosed methodologies.

It will be understood that one or more processing devices may be configured to execute or otherwise be programmed with software, firmware, logic, and/or other program instructions, which are stored within one or more non-transitory tangible computer-readable mediums to perform the operations, tasks, functions, or actions described herein for the disclosed embodiments. The one or more processing devices may include, e.g., a central processing unit (CPU), controller, microcontroller, processor, microprocessor, field programmable gate array (FPGA), application specific integrated circuit (ASIC), or other suitable processing device. The one or more non-transitory tangible computer-readable mediums may include, e.g., data storage devices, flash memories, random update memories, read only memories, programmable memory devices, reprogrammable storage devices, hard drives, floppy disks, DVDs, CD-ROMs, and/or any other tangible data storage mediums.

While the present disclosure may be adaptable to various modifications and alternative forms, specific embodiments have been shown by way of example and described herein. However, it should be understood that the present disclosure is not intended to be limited to the particular forms disclosed. Rather, the present disclosure is to cover all modifications, equivalents, and alternatives falling within the spirit and scope of the present disclosure as defined by the appended claims. Moreover, the different aspects of the disclosed systems and methods may be utilized in various combinations and/or independently. Thus, the present disclosure is not limited to only those combinations shown herein, but rather may include other combinations.

What is claimed is:

1. A system, comprising:
a plurality of information handling systems (IHSs) coupled to and managed by a remote management system, wherein each IHS includes a policy enforcement engine comprising a first set of program instructions, which are stored within a memory of the IHS and executable by a processing device of the IHS to:
monitor contextual information pertaining to the IHS to detect a change in the contextual information;
determine that the change in the contextual information triggers;
one or more events when an undesirable change in the contextual information is detected; and
one or more inverse events when a desirable change in the contextual information is detected; and
transmit a notification over a network to the remote management system when the one or more events or the one or more inverse events are triggered by the change in the contextual information, wherein the notification identities the one or more events or the one or more inverse events triggered by the change in the contextual information;
the remote management system, wherein the remote management system includes a policy selection engine comprising a second set of program instructions, which are stored within a memory of the remote management system and executable by a processing device of the remote management system to:
receive the notification identifying the one or more events or the one or more inverse events, wherein the notification is transmitted from at least one of the IHSs over the network;
select from a plurality of policy sets, a policy set to be applied to one or more of the IHSs based on the received notification, wherein:
a first policy set is selected if the received notification identifies the one or more inverse events, indicating that a desirable change in context has occurred within the at least one IHS; and
a second policy set is selected if the received notification identifies the one or more events, indicating that an undesirable change in context has occurred within the at least one IHS;
wherein the first policy set and the second policy set each define a set of rules and restrictions applied to the one or more IHSs; and
wherein the second policy set are more restrictive than the first policy set; and
transmit the selected policy set over the network to the one or more IHSs; and wherein the policy enforcement engine further comprises a third set of program instructions stored within the memory of each IHS, wherein the processing device of the one or more IHSs executes the third set of program instructions to:
receive the selected policy set transmitted from the remote management system to the one or more IHSs;
store the selected policy set within a computer readable storage medium of the one or more IHSs; and
perform actions specified by the selected policy set when policy rules specified by the selected policy set are violated.

2. The system as recited in claim 1, wherein the contextual information pertaining to the IHS comprises a network connection of the IHS, a physical location of the IHS, a security posture of the IHS, an operating system version installed on the IHS, a user role and/or a user behavior.

3. The system as recited in claim 1, wherein each IHS further includes one or more data collection modules comprising a fourth set of program instructions, which are stored within the memory of the IHS and executable by the processing device of the IHS to:
collect data pertaining to the IHS, wherein the collected data comprises the contextual information; and
provide the collected data to the policy enforcement engine.

4. The system as recited in claim 3, wherein the data pertaining to the IHS comprises current data and historical data pertaining to the IHS.

5. The system as recited in claim 1, wherein the first set of program instructions is further executable to:
compare current data pertaining to the IHS to historical data stored within the IHS, wherein the current data comprises the contextual information;
determine that the current data triggers one or more events if the comparison indicates a change in behavior of the IHS or a user of the IHS; and
transmit a notification of the behavior change over the network to the remote management system.

6. The system as recited in claim 1, wherein the first set of program instructions is further executable to:
monitor a current network connection, a current physical location or a current security posture of the IHS;
determine whether or not the IHS is currently connected to a secure network or unsecure network, currently located in a restricted location, and/or if the security of the IHS has been compromised; and
transmit a notification over the network to the remote management system based on the determination.

7. The system as recited in claim 1, wherein the second set of program instructions is further executable to:
classify policies into groups;
specify at least two sets of policies for each of the groups, including a more restrictive policy set and a less restrictive policy set;
identify which of the groups the received notification corresponds to; and
select, from the identified group, a policy set to be applied to one or more of the IHSs based on the received notification.

8. The system as recited in claim 1, wherein the first set of program instructions is further executable to continually monitor the data pertaining to the IHS and transmit a new notification to the remote management system over the network in response to the continually monitored data triggering one or more events.

9. A computer-implemented method for updating a policy stored within an information handling system (IHS), wherein the method is performed by the IHS, and wherein the IHS is coupled to and managed by a remote management system, the computer-implemented method comprising:
monitoring data pertaining to the IHS, wherein the policy stored within the IHS defines a set of rules and restrictions applied to the IHS, and wherein said monitoring data pertaining to the IHS comprises:
monitoring current data pertaining to the IHS; and
comparing the current data to historical data stored within the IHS to detect a change in behavior of the IHS or a user of the IHS, the historical data comprising an aggregation of data collected from the IHS over time; and
determining that the current data triggers one or more events if the comparison of the current data to the historical data detects a change in behavior, wherein if the current data triggers one or more events, the method further comprises:
transmitting a notification of the change in behavior to the remote management system;
receiving a new policy from the remote management system in response to the notification, the new policy defining a set of rules and restrictions that differ from the set of rules and restrictions defined within the policy set;
storing the new policy within a memory of the IHS upon aid receiving; and
performing actions specified by the new policy when one or more of the rules and restrictions specified by the new policy a violated.

10. The computer-implemented method as recited in claim 9, wherein said monitoring data pertaining to the IHS further comprises monitoring at least one of a network connection of the IHS, a physical location of the IHS, and a security posture of the IHS.

11. The computer-implemented method as recited in claim 10, wherein said determining further comprises detecting a change in network connectivity of the IHS, a change in the physical location of the IHS, and a change in security posture of the IHS based on said monitoring.

12. A computer-implemented method performed by a remote management system coupled and configured to manage a plurality of information handling systems (IHSs) operating within a managed environment, the method comprising:
receiving a notification transmitted over a network from at least one IHS within the managed environment, wherein the notification includes:
an event when an undesirable change in contextual information has been detected by the at least one IHS; and
an inverse event when a desirable change in contextual information has been detected by the at least one IHS;
selecting a policy set to be applied to one or more of the IHSs based on the event or the inverse event included within the received notification, wherein the policy set defines a set of rules and restrictions applied to the one or mom IHSs, and wherein selecting the policy set comprises;
selecting a first policy set if the received notification includes the inverse event; and
selecting a second policy set if the received notification includes the event, wherein the second policy set is more restrictive than the first policy set; and transmitting the selected policy set over the network to the one or more IHSs, so that the one or more IHSs perform actions specified by the selected policy set when the set of rules and restrictions specified by the selected policy set are violated.

13. The computer-implemented method as recited in claim 12, wherein the step of selecting a policy set comprises:
    selecting the second policy set to be applied and transmitted to the at least one IHS over the network, if the event included within the received notification indicates that the at least one IHS is connected to an unsecure network; and
    selecting the first policy set to be applied and transmitted to the at least one IHS over the network, if the inverse event included within the received notification indicates that the at least one IHS is connected to a secure network.

14. The computer-implemented method as recited in claim 12, wherein the step of selecting a policy set comprises:
    selecting the second policy set to be applied and transmitted to the at least one IHS over the network, if the event included within the received notification indicates that the at least one IHS is physically located in a restricted location; and
    selecting the first policy set to be applied and transmitted to the at least one IHS over the network, if the inverse event included within the received notification indicates that the at least one IHS is not physically located in a restricted location.

15. The computer-implemented method as recited in claim 12, wherein the step of selecting a policy set comprises:
    selecting the second policy set to be applied and transmitted to each of the plurality of IHSs over the network, if the event included within the received notification indicates that a security posture of at least one IHS is compromised or vulnerable to threats; and
    selecting the first policy set to be applied and transmitted to the plurality of IHSs over the network, if the inverse event included within the received notification indicates that the security posture of the at least one IHS is secure.

16. The computer-implemented method as recited in claim 12, wherein the step of receiving a notification comprises receiving a notification of unusual behavior transmitted from the at least one IHS over the network, and wherein a different notification of unusual behavior is transmitted by the at least one IHS over the network to the remote management system for different types of unusual behavior detected by the at least one IHS.

17. The computer-implemented method as recited in claim 16, wherein the step of selecting a policy set comprises selecting a policy set from a plurality of policy sets, each comprising a different set of rules and/or restrictions, based on the type of unusual behavior detected by the at least one IHS and the notification of unusual behavior received from the at least one IHS.

* * * * *